(12) United States Patent
Tai et al.

(10) Patent No.: US 7,378,655 B2
(45) Date of Patent: May 27, 2008

(54) APPARATUS AND METHOD FOR SENSING ELECTROMAGNETIC RADIATION USING A TUNABLE DEVICE

(75) Inventors: Yu-Chong Tai, Pasadena, CA (US); Matthieu Liger, Pasadena, CA (US); Ming C. Wu, Orinda, CA (US); Jui-che Tsai, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 323 days.

(21) Appl. No.: 10/821,790

(22) Filed: Apr. 9, 2004

(65) Prior Publication Data

US 2005/0017177 A1    Jan. 27, 2005

Related U.S. Application Data

(60) Provisional application No. 60/462,200, filed on Apr. 11, 2003.

(51) Int. Cl.
*G01J 5/00* (2006.01)
(52) U.S. Cl. .................................. 250/338.1
(58) Field of Classification Search .............. 250/338.1
See application file for complete search history.

(56) References Cited

U.S. PATENT DOCUMENTS

| 4,752,694 A | 6/1988 | Hegel, Jr. et al. |
| 5,286,976 A | 2/1994 | Cole |
| 5,300,915 A | 4/1994 | Higashi et al. |
| 5,420,419 A | 5/1995 | Wood |
| 6,083,557 A * | 7/2000 | Belcher et al. ............. 427/497 |
| 6,621,083 B2 | 9/2003 | Cole |
| 2001/0015810 A1* | 8/2001 | Hara et al. .................. 356/519 |
| 2005/0226281 A1* | 10/2005 | Faraone et al. ............... 372/20 |

OTHER PUBLICATIONS

Terre et al. "Microbolometer development and production at Indigo Systems", downloaded at http://www.indigosystems.com/PDF/SPIE/SPIE_2003_Bolometers.pdf on Jan. 25, 2007.
"Uncooled Infrared Microbolometer" Honeywell Technology Licensing downloaded at http://honeywell.t2h.yet2.com/t2h/page/listing?keyword=&Id=111&qid at Jan. 25, 2007.

* cited by examiner

*Primary Examiner*—Christine Sung
(74) *Attorney, Agent, or Firm*—Townsend and Townsend and Crew LLP

(57) ABSTRACT

A method for manufacturing a sensing device, such as a bolometer device or other devices. The method includes providing a substrate, e.g., silicon wafer. The method includes forming a first reflection layer overlying the substrate and forming a first electrode layer overlying the substrate. The method includes forming a sacrificial layer overlying a portion of the first reflection layer and a portion of the first electrode layer. The sacrificial layer is patterned using photolithography techniques. The patterned sacrificial layer corresponds to a cavity region. The method also forms a second electrode layer overlying the sacrificial layer and forms an elastic layer overlying the patterned sacrificial layer. The elastic layer encloses the cavity region corresponding to the patterned sacrificial layer. The method releases the sacrificial layer to form an opening in the cavity region.

25 Claims, 13 Drawing Sheets

APPARATUS AND METHOD FOR SENSING ELECTROMAGNETIC RADIATION USING A TUNABLE DEVICE

CROSS-REFERENCES TO RELATED APPLICATIONS

This application claims priority to U.S. Provisional Patent Application No. 60/462,200, filed Apr. 11, 2003, titled "RESONANCE-ENHANCED TUNABLE BOLOMETER," of Yu-Chong Tai et al., and is hereby incorporated by reference herein in its entirety for all purposes.

STATEMENT AS TO RIGHTS TO INVENTIONS MADE UNDER FEDERALLY SPONSORED RESEARCH OR DEVELOPMENT

Work described herein has been supported by the National Science Foundation Grant No. EEC-9402726. The United States Government may therefore have certain rights in the invention.

BACKGROUND OF THE INVENTION

The present invention is directed to sensing devices and their processing. More particularly, the invention provides a method and apparatus for sensing electromagnetic radiation in the infrared spectrum using a tunable bolometer device. But it would be recognized that the invention has a much broader range of applicability. For example, the invention can be applied to other wavelengths such as millimeter waves or visible light and others.

As technology progresses, detection devices have become important. Detection devices range from motion sensors to those that detect certain frequencies of electromagnetic radiation. Such detection devices include, among others, infrared detectors and imagers. As merely an example, conventional infrared detectors, commonly known as bolometers, received interest from their ability to detect infrared radiation through changes in temperature. Preferably, such bolometers work at room temperature, but can also work at other temperatures.

Many applications emerged using these conventional bolometer devices. Night vision techniques evolved with such infrared radiation detectors. That is, infrared radiation emitted from warm bodies are detected using an array of sensing devices on infrared detectors. Other types of applications include chemical detection and the like. For these applications, other types of conventional bolometer devices have been used.

Conventional bolometers often include passive absorbent layers that detect infrared radiation. These passive layers include metals that absorb infrared radiation and convert such radiation into an increase in temperature. The passive absorbent layers operate within a range of large spectral sensitivity. Accordingly, limitations exist with such conventional bolometer devices. Large spectral sensitivity allows for detection of more than one frequency of incoming infrared radiation. That is, these devices cannot often detect a spectral composition or specific frequencies of the incoming infrared radiation. These and other limitations may be discussed throughout the present specification and more particularly below.

From the above, it is seen that an improved technique for processing devices is desired.

BRIEF SUMMARY OF THE INVENTION

According to the present invention, techniques directed to sensing devices and their processing are provided. More particularly, the invention provides a method and apparatus for sensing electromagnetic radiation in the infrared spectrum using a tunable bolometer device. But it would be recognized that the invention has a much broader range of applicability. For example, the invention can be applied to other wavelengths such as millimeter waves or visible light and others.

In a specific embodiment, the present invention provides an integrated tunable sensing apparatus for electromagnetic radiation, e.g., infrared. The apparatus has a substrate, which has a backside and a face. The terms "backside" and "face" have no specific orientation relative to gravity or other reference direction. The substrate can be made of a suitable material, e.g., silicon. The apparatus also has a tunable cavity region coupled to the backside of the substrate. An elastic material (e.g., polymer, Parylene, SU-8 polymer) is forming a region including the tunable cavity region. The apparatus has a first reflection device within a first portion of the tunable cavity region and a second reflection device within a second portion the cavity region. The first reflection devices faces the second reflection device. Preferably, each of the reflection devices comprises a mirror. Each of these devices also include surfaces that are parallel to each other. A movable gap (e.g., 1.5 microns to 8 microns) is formed between the first reflection device and the second reflection device within the tunable cavity region. The movable gap has a dimension normal to each of the surfaces of the reflection devices. An actuation device (e.g., electrostatic electrode devices) is coupled to the tunable cavity region. The actuation device is adapted to cause movement from a first predetermined spatial dimension to a second predetermined spatial dimension of the movable gap. A detection device is coupled to the tunable cavity. Preferably, the sensing device comprises one of the reflection devices.

In an alternative specific embodiment, the present invention provides a method for sensing electromagnetic radiation having a predetermined frequency or wavelength from a plurality of wavelengths. The method includes providing a tunable cavity region, which has a first reflection device within a first portion of the tunable cavity region and has a second reflection device within a second portion of the cavity region. The second reflection device faces the first reflection device and are parallel to each other in a preferred embodiment. The tunable cavity region also has a movable gap formed between the first reflection device and the second reflection device within the tunable cavity region. The method includes moving the movable gap from a first predetermined spatial dimension to a second predetermined spatial dimension using an actuation device coupled to the tunable cavity region. The movement can be stepped, continuous, or any combination of these, depending upon the embodiment. The method includes causing a resonating characteristic of a selective wavelength corresponding to an infrared band ("IR") of electromagnetic radiation between the first reflection device and the second reflection device within the tunable cavity while being maintained at the second predetermined spatial dimension. The method prevents one or more wavelengths outside of the selected wavelength from achieving a resonating characteristic between the first reflection device and the second reflection device while the movable gap is maintained at the second predetermined spatial dimension. Preferably, the one or more other wavelengths do not resonate in the tunable cavity. The method captures information associated with the selected wavelength using a detection device coupled to the tunable cavity region. Preferably, the electromagnetic radiation in the selected IR band resonates within the tunable cavity. The resonating radiation is absorbed by the detection device. The detection device converts the radiation into an output which is measurable. The output is correlated to the selected IR band. Of course, depending upon the type of sensor, there can be other variations, modifications, and alternatives.

In yet an alternative specific embodiment, the invention provides a method for manufacturing a sensing device, such as a bolometer device or other devices. The method includes providing a substrate, e.g., silicon wafer. The method includes forming a first reflection layer overlying the substrate and forming a first electrode layer overlying the substrate. The method includes forming a sacrificial layer overlying a portion of the first reflection layer and a portion of the first electrode layer. The sacrificial layer is patterned using photolithography techniques. The patterned sacrificial layer corresponds to a cavity region. The method also forms a second electrode layer overlying the sacrificial layer and forms an elastic layer overlying the patterned sacrificial layer. The elastic layer encloses the cavity region corresponding to the patterned sacrificial layer. The method releases the sacrificial layer to form an opening in the cavity region.

Many benefits are achieved by way of the present invention over conventional techniques. For example, the present technique provides an easy to use process that relies upon conventional technology. In some embodiments, the method provides higher device yields in dies per wafer. Additionally, the method provides a process that is compatible with conventional process technology without substantial modifications to conventional equipment and processes. Preferably, the invention provides for a method and device that can provide selective defection of certain IR frequencies. Preferably, the resonance-enhanced tunable bolometer senses infrared in a short wavelength range. Moreover, the wavelength being measured can be tuned by an external voltage, which can be coupled to a controller. Using Parylene rather than conventional materials (such as silicon nitride or polysilicon) allows for improvements in performance due to its mechanical and thermal properties. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques directed to sensing devices and their processing are provided. More particularly, the invention provides a method and apparatus for sensing electromagnetic radiation in the infrared spectrum using a tunable bolometer device. But it would be recognized that the invention has a much broader range of applicability. For example, the invention can be applied to other wavelengths such as millimeter waves or visible light and others.

Figure 1:
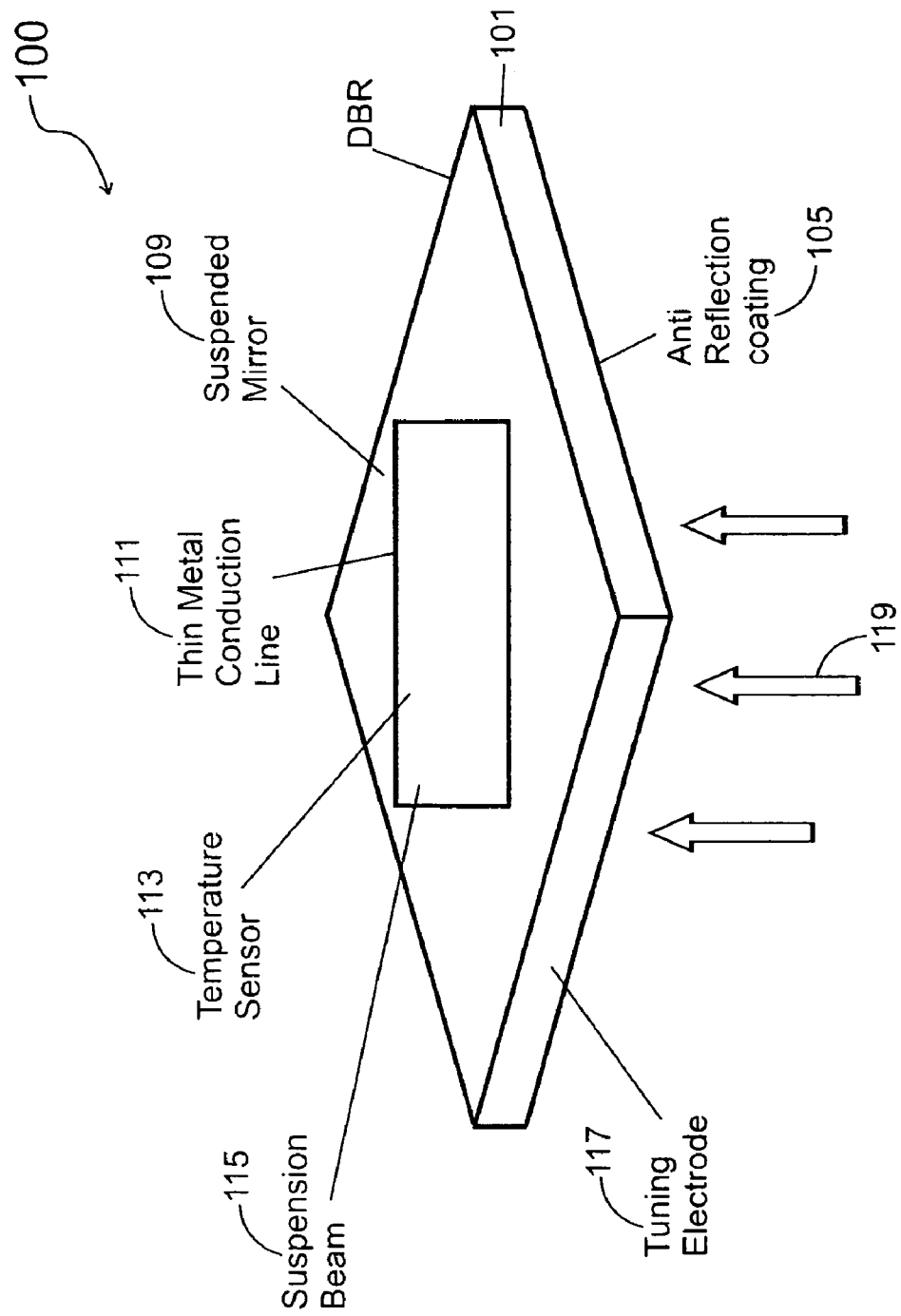
FIG. 1 is a simplified diagram of a tunable bolometer device according to an embodiment of the present invention.

FIG. 1 is a simplified diagram of a tunable bolometer device 100 according to an embodiment of the present invention. This diagram is merely an example, which should not unduly limit the scope of the claims herein. One of ordinary skill in the art would recognize many variations, alternatives, and modifications. As shown, the device 100 has a Fabry-Perot (FP) cavity microfabricated on an infra-red-transparent substrate 101. The transparent substrate can be made of a suitable material. The suitable material can include silicon bearing materials (e.g., silicon wafer), germanium, quartz, and others. The substrate can be homogeneous, graduated, or multilayered, depending upon the application.

As shown, electromagnetic radiation 119 in the form of light comes into the cavity from a region underneath the substrate. Preferably, the radiation include those of the infrared wavelength spectrum, visible light, and others. The radiation traverses through the underneath region, enters the cavity, and reflects off of the interior surfaces, including reflection devices. The backside may include antireflection layer 105, which includes coatings, laminations, and other materials. The coatings are preferably transparent, but can also be others. Preferably, the radiation having a selected wavelength and frequency resonates within the cavity. Details of such reflection devices can be found throughout the present specification and more particularly below.

In a specific embodiment for the FP cavity, the device includes a pair of reflection devices 109. The reflection devices are preferably non-glossy mirrors such as dielectric mirrors. The dielectric mirrors allow resonant frequencies to be transmitted while all the other frequencies are reflected. According to the present device, one or two of the cavity mirrors is made of a metal material, which has certain reflectivity characteristics. Depending upon the embodiment, the mirror structures may be fabricating with certain thicknesses. In certain embodiments, metal mirrors absorb the electromagnetic radiation that is not reflected and transmission is negligible when such mirrors are within a predetermined thickness. Such predetermined thickness, most if not all of the incoming radiation at the resonant frequency will be absorbed in the cavity, while the other frequencies are reflected by the cavity, thus providing wavelength-selective absorption. Of course, there can be other variations, modifications, and alternatives.

In a specific embodiment, the device includes a bottom mirror overlying a portion of the substrate. A top mirror is suspended over an air gap by a suspension beam 109, 115. Here, the term "top" and "bottom" are not intended to be directed to an orientation associated with a direction of gravity or other reference. The top mirror can be made of a suitable material. The suitable material includes a composite layer of metal and Parylene or metal only or any combination of these, and dielectric films. Of course, there can be other variations, modifications, and alternatives.

A temperature sensor 113 is placed on top of the suspending mirror to measure information associated with an amount of absorbed radiation from the infrared radiation. The temperature sensor can be made of a suitable material such as a high-TCR metal oxide (such as vanadium oxide) or by Parylene made electrically conductive by ion-implantation or others. The temperature sensor is electrically connected by thin metal lines 111. Preferably, the metal lines conduct a limited amount of thermal energy. Of course, there can be other variations, modifications, and alternatives.

The bolometer device also includes a drive device. The drive device has electrodes 117 placed under the suspended mirror as shown. By applying a selected voltage between the suspended mirror and the electrodes, electrostatic force pulls-down the suspended mirror, thus changing the size of the gap. Changing the gap size causes a change in a resonant frequency of the FP cavity, which relates to the wavelength sensed by the present bolometer device. Changing the applied voltage over a certain range tunes the wavelength being sensed.

Preferably, Fabry-Perot cavities resonate when the wavelength lambda is 2*(gap)/n, n being any integer. Preferably, n=1 but in theory others can be used. In a specific embodiment, the wavelength/gap can be: 3-5 microns in wavelength (1.5-2.5 micron gap) and 8-14 microns in wavelength (4-7 microns gap), among others. Alternatively, the gap can be increased rather than decreased according to certain embodiments. Further details of the present device can be found throughout the present specification and more particularly below.

Figure 2:
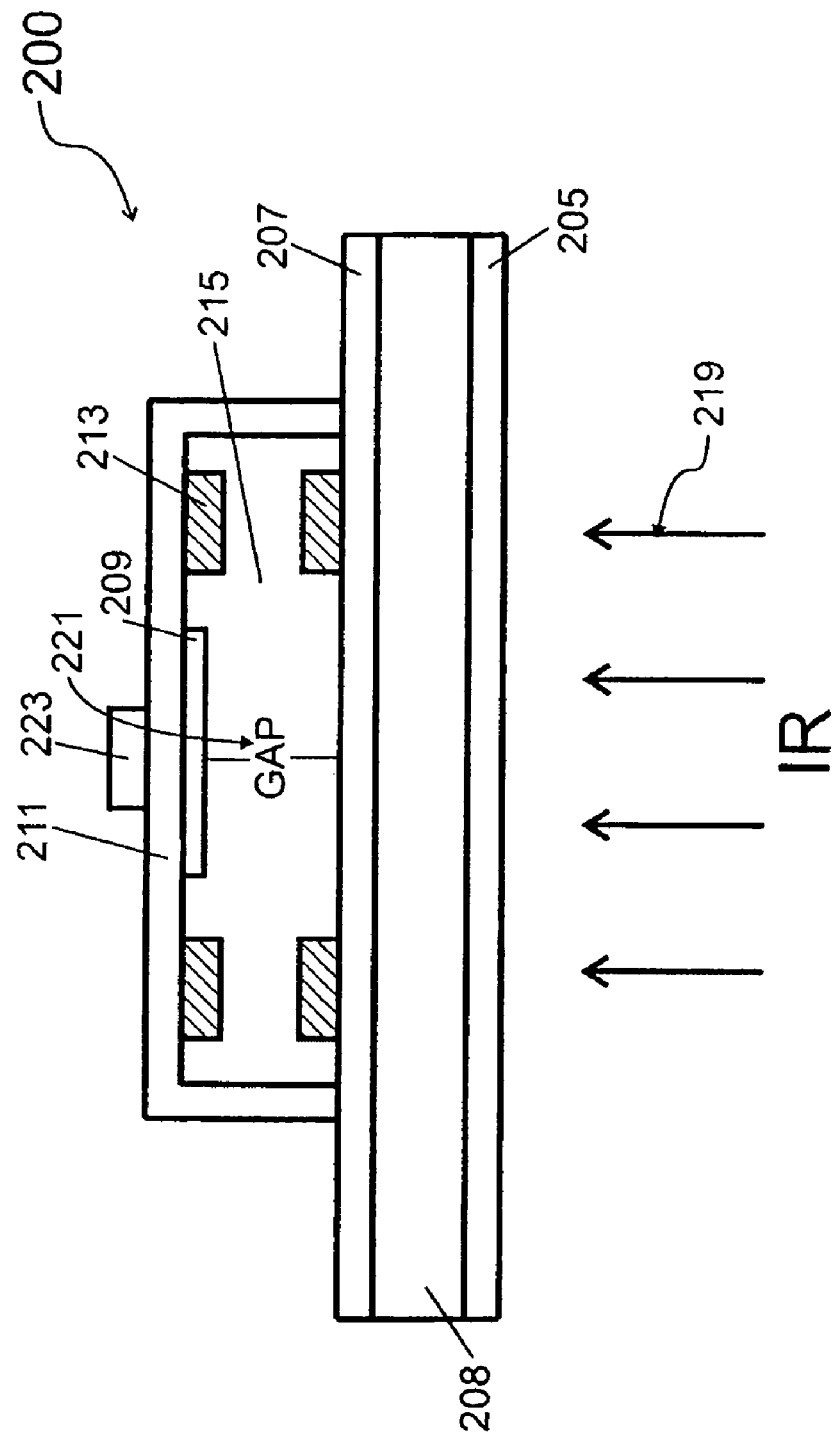
FIG. 2 is a simplified side-view diagram of a tunable sensing device according to an embodiment of the present invention.

FIG. 2 is a simplified side-view diagram of a tunable sensing device according to an embodiment of the present invention. This diagram is merely an example, which should not unduly limit the scope of the claims herein. One of ordinary skill in the art would recognize many variations, alternatives, and modifications. As shown, the present invention provides an integrated tunable sensing apparatus 200 for electromagnetic radiation, e.g., infrared. The apparatus has a substrate 208 which has a backside and a face. The terms "backside" and "face" have no specific orientation relative to gravity or other reference direction. The substrate can be made of a suitable material, e.g., silicon. Other materials can also be used for the substrate. The substrate can also include an anti-reflection coating 205, which can be deposited, sputtered, etc. The coating can be a single layer or multiple layers. Infrared radiation 219 enters through the backside, as shown.

The apparatus also has a tunable cavity region 215 coupled to the backside of the substrate. An elastic material (e.g., polymer, Parylene) 211 is forming a region including the tunable cavity region. The elastic material can move and change in shape while being capable of restoring back to its original shape. Further details of the elastic material will be provided throughout the present specification and more particularly below.

The apparatus has a first reflection device 209 within a first portion of the tunable cavity region and a second reflection device 207 within a second portion the cavity region. The first reflection devices faces the second reflection device. Preferably, each of the reflection devices comprises a mirror. Each of these devices also include surfaces that are parallel to each other. A movable gap (e.g., 1.5 microns to 8 microns) 221 is formed between the first reflection device and the second reflection device within the tunable cavity region. The movable gap 221 has a dimension normal to each of the surfaces of the reflection devices. An actuation device (e.g., electrostatic electrode devices) is coupled to the tunable cavity region. Preferably, the actuation device includes a pair of electrodes 213, which are disposed within the interior region of the cavity or may also be within the elastic material or other location that is suitable for causing the gap to move within the cavity. The electrodes are often coupled to a drive device that supplies a voltage potential between the pair of electrodes. The drive device is coupled to a controller, which receives feedback from a detection device 223.

Preferably, the apparatus has been packaged using suitable techniques. In a specific embodiment, the substrate, the elastic material, first reflection device, second reflection device, movable gap, actuation device and detection device are enclosed in a package. The package has a window region facing the backside of the substrate. The window region is adapted to allow electromagnetic radiation to traverse there through. Preferably, the package has been sealed in a vacuum and/or hermetically sealed, depending upon the embodiment.

Figure 3:
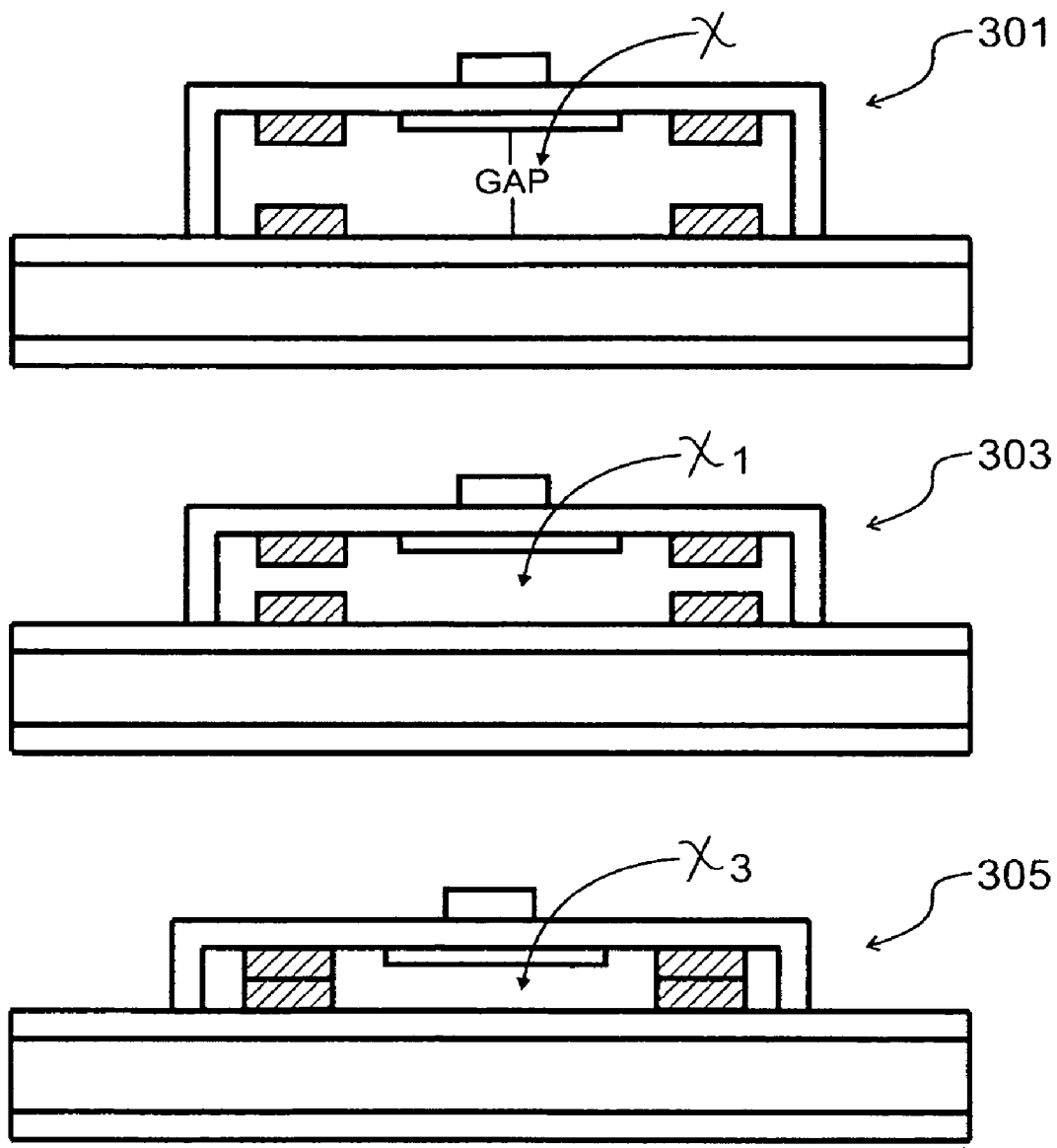
FIG. 3 is a simplified diagram of a tunable cavity according to an embodiment of the present invention.
Figure 4:
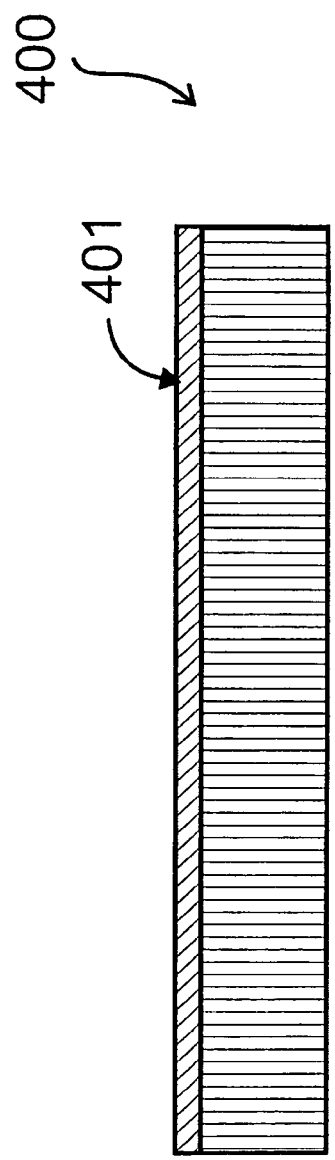
FIGS. 4 through 7 illustrate a simplified method of fabricating a bolometer device according to an embodiment of the present invention.

Referring to FIG. 3, the actuation device is adapted to cause movement from a first predetermined spatial dimension to a second predetermined spatial dimension of the movable gap. As shown, the actuation device allows the gap to be moved from a first spatial dimension x 301 to a second spatial dimension $x_1$ 303. The gap can also be $x_3$ 305, where the electrode elements are coupled together. The gap can be changed in a stepped, or continuous manner, depending upon the application. As also shown, the elastic material that encloses the cavity can change shape and then return back to its original condition, depending upon the application. The original position is illustrated by reference numeral 301. An intermediary position is illustrated by reference numerals 303 and 305. Of course, there can be other variations, modifications, and alternatives.

Preferably, the detection device 223 is coupled to the tunable cavity. Preferably, the detection device comprises one of the reflection devices. In a specific embodiment, the detection device can be a temperature sensor placed within a vicinity of the reflection device to measure information associated with an amount of absorbed radiation from the infrared radiation. The temperature sensor can be made of a suitable material such as a high TCR metal oxide (such as vanadium oxide) or by Parylene made electrically conductive by ion-implantation or others. The temperature sensor is electrically connected by thin metal lines, which are coupled to the controller. The metal lines also serve as poor heat conductors depending upon the embodiment. Of course, there can be other variations, modifications, and alternatives.

A method for fabricating a detection device according to an embodiment of the present invention may be outlined as follows:

1. Provide a substrate, e.g., silicon wafer;
2. Form a first reflection layer overlying the substrate;
3. Form a first electrode layer overlying the substrate;
4. Form a sacrificial layer overlying a portion of the first reflection layer and a portion of the first electrode layer;
5. Pattern the sacrificial layer using photolithography techniques (the sacrificial layer corresponding to a cavity region);
6. Form a second electrode layer overlying the sacrificial layer;
7. Form an elastic layer overlying the patterned sacrificial layer to encloses the cavity region corresponding to the patterned sacrificial layer that is left intact;
8. Form a detector overlying the elastic layer;
9. Release the sacrificial layer to form an opening in the cavity region, which corresponds to the tunable cavity; and
10. Perform other steps, as desired.

The above sequence of steps provides a method according to an embodiment of the present invention. As shown, the method uses a combination of steps including a way of forming a detection device that has an integrated cavity, which is tunable. Other alternatives can also be provided where steps are added, one or more steps are removed, or one or more steps are provided in a different sequence without departing from the scope of the claims herein. Further details of the present method can be found throughout the present specification and more particularly below.

FIGS. 4 through 7 illustrate a simplified method of fabricating a bolometer device according to an embodiment of the present invention. These diagrams are merely examples, which should not unduly limit the scope of the claims herein. One of ordinary skill in the art would recognize many variations, alternatives, and modifications. As shown, the method includes providing a substrate, e.g., silicon wafer 400. The method includes forming a first reflection layer 401 overlying the substrate. Preferably, the reflection layer can be formed using deposition of the on-substrate reflector (which can be a metallic mirror or a Distributed Bragg Reflector) by sputtering or evaporation or any combination of these techniques.

The method forms a first electrode layer overlying the substrate. The electrode layer can be made of any suitable material that is conductive. The electrode layer can be made of metal such as gold or aluminum or other like materials. Preferably, the gold or aluminum is evaporated and patterned using conventional lithography techniques. The electrode layer can be a continuous structure located around a peripheral region of a resulting cavity. The electrode layer can also include multiple layers, which are disposed in a certain spatial configuration. Of course, one of ordinary skill in the art would recognize many other variations, modifications, and alternatives.

Figure 5:
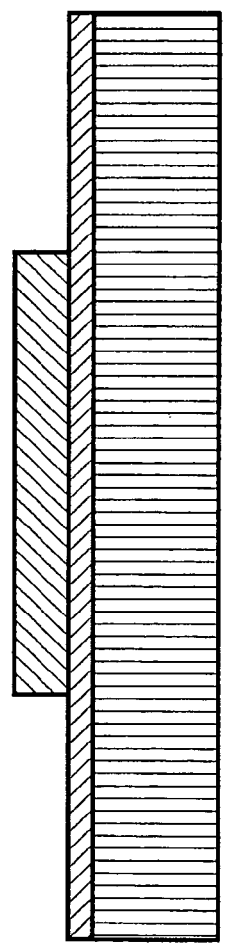

The method includes forming a sacrificial layer overlying a portion of the first reflection layer and a portion of the first electrode layer. The sacrificial layer is patterned using photolithography techniques. The patterned sacrificial layer corresponds to a cavity region. Preferably, the sacrificial layer, which can be amorphous silicon or a composite photoresist and amorphous silicon layer, is then deposited by sputtering, plasma-enhanced chemical vapor deposition and/or spinning or any combination of these techniques. The sacrificial layer is patterned using photolithography techniques, as shown in FIG. 5.

Figure 6:
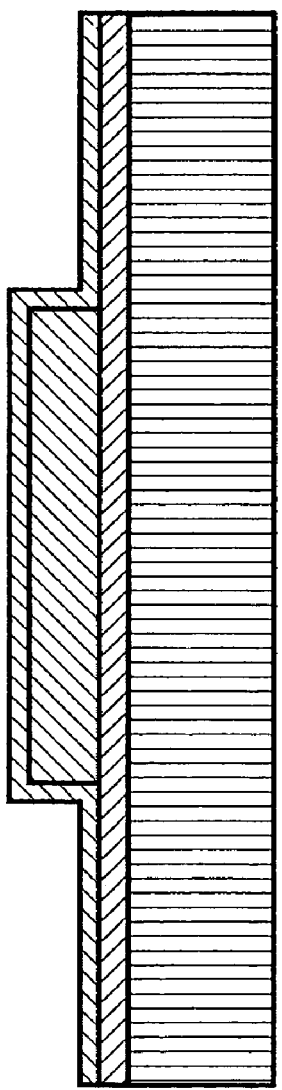
Figure 7:
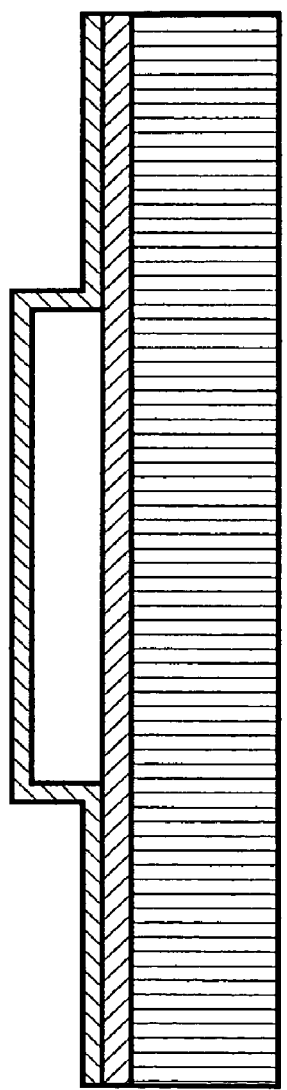

Referring to FIG. 6, the method forms a second electrode layer overlying the sacrificial layer. Preferably, the second electrode layer is formed using a metal layer, which is later patterned. According to a specific embodiment, the second electrode layer also corresponds to a second reflection layer. The second reflection layer can be a mirror. The mirror is deposited either by evaporation of sputtering or other techniques. Alternatively, the method forms a separate electrode layer and second reflection layer using two different layers depending upon the embodiment.

The method forms an elastic layer overlying the patterned sacrificial layer. The elastic layer encloses the cavity region corresponding to the patterned sacrificial layer. Preferably, the elastic layer can be made of a suitable material, such as a polymer (Parylene), silicon nitride, or other suitable materials. The elastic layer acts as a support member that encloses the cavity region, which is still occupied by a portion of sacrificial material. Preferably, the Parylene layer is deposited using chemical vapor deposition ("CVD") at room temperature and is then patterned.

The method then releases the sacrificial layer to open the cavity region. Releasing the sacrificial layer can be performed using selected etching and/or other techniques. Preferably, the releasing occurs using xenon difluoride or bromine trifluoride or other species. The method then forms a temperature sensing element, which can be either vanadium oxide or ion-implanted Parylene, overlying the elastic material. Depending upon the embodiment, the temperature sensing element can also be formed in other ways. The method then forms a metal layer overlying the elastic layer. Preferably, the metal layer can serve as both an electrical and thermal conductor. More preferably, the metal layer can server as a portion of the temperature sensor according to certain embodiments. The metal layer is patterned using lithographic techniques. Of course, there can be other variations, modifications, and alternatives.

Although the above has been described in terms of specific embodiments, there can be other variations, modifications, and alternatives. For example, the cavity can be made of two metal mirrors, one metallic mirror and one DBR, or two DBR, or other combination of these. Additionally, the he original air gap height can be modified to cover different wavelength regions, including visible light, and other portions of the electromagnetic radiation spectrum as well as other spectrums. The present resonance-enhanced tunable bolometer can be fabricated in an array configuration for adaptive imaging applications. Such an array could have pixel-by-pixel tunability. The ability to select any wavelength bands at the pixel level will reduce the amount of data that needs to be downloaded and processed for the desired information. These and other variations will be further described throughout the present specification and more particularly below.

EXAMPLES

To illustrate certain principles and operations of the present invention, we have proposed certain experiments and prepared designs to carryout the functionality of certain aspects of the invention defined herein. As will be appreciated, these experiments are merely examples, which should not unduly limit the scope of the claims herein. One of ordinary skill in the art would recognize many variations, modifications, and alternatives. Also, the experiments and designs described herein are merely intended to assist the reading in understanding certain aspects of the invention without limiting the claims as recited herein.

We have proposed a resonance-enhanced intra-cavity tunable bolometer design that enables high absorption (e.g., >90%), high resolution (e.g., FWHM <0.03 μm at LWIR), low noise (e.g., NETD as low as 6 mK), high speed (e.g., 60 Hz frame rate and greater), and broad tuning range (across LWIR). Of course, there can be other variations, modifications, and alternatives.

Figure 8:
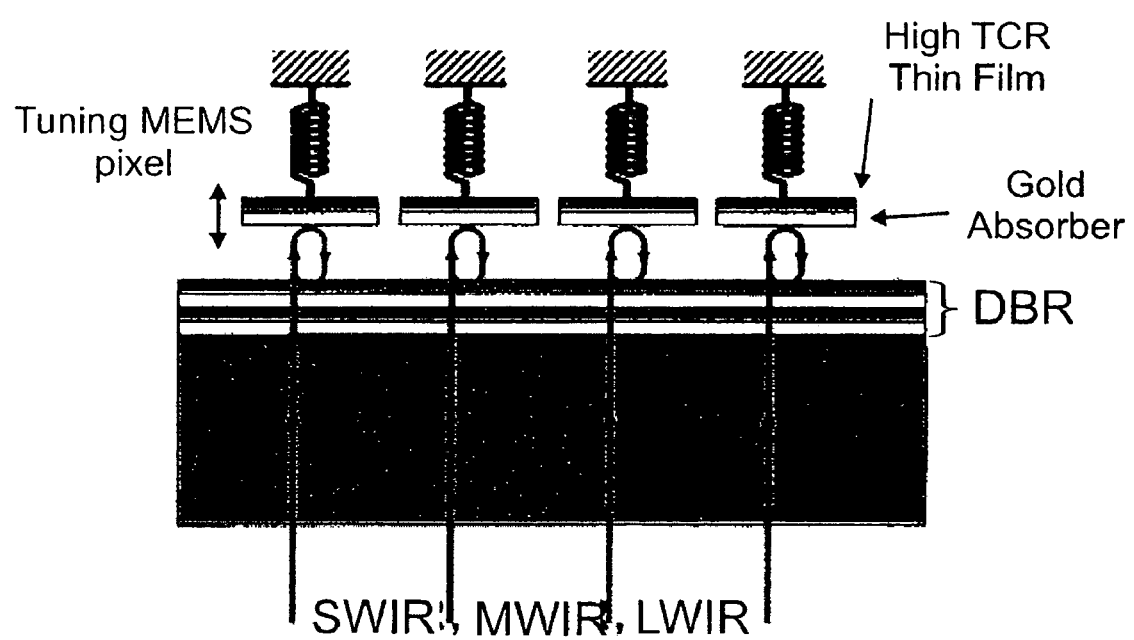
FIG. 8 through 14 illustrate characteristics of a tunable bolometer device according to examples of the present invention.

We have designed and proposed a room temperature uncooled resonance-enhanced intra-cavity tunable bolometer adaptive focal plane array (herein "AFPA"), which is enabled by a Parylene optical MEMS technology. Referring to FIG. 1 again, we proposed a monolithic tunable bolometer, i.e., the single monolithic pixel contains a Fabry-Perot tunable filter, a resonant absorber and an uncooled bolometer, according to an embodiment of the present invention. A schematic diagram of the present bolometer is illustrated by FIG. 8. The bolometer places an absorber inside a tunable Fabry-Perot (FP) cavity, where the absorption is enhanced by the resonance of the cavity. Our calculation shows that absorption with 90-95% can be achieved using a low-loss front reflector and a 20-nm-thick gold as both absorber and back reflector. The cavity resonance also enables us to achieve a desirable wavelength band (wavebin) as narrow as 0.03 μm Full Width Half Maximum (FWHM) at long wavelength infrared ("LWIR"). The resolution is better than conventional devices and is ideal for Hyperspectral imaging (HSI) or even more demanding environmental sensing applications. The absorption peak can be tuned across the entire short wavelength infrared ("SWIR"), medium wavelength ("MWIR"), or LWIR band using electrostatic MEMS actuators and broadband reflectors that have been described throughout the present specification and more particularly below. The number of discernible wavebins at LWIR atmospheric window (8 to 12 μm) is as high as 200. Compared with designs using separate IR absorbers and tunable FP filter, the intra-cavity can achieve high responsivity with lower thermal capacity. Therefore small thermal time constant ($\tau=C/G$) can be achieved to support high-speed (>60 Hz frame rate) tracking of moving target. In addition, the monolithic design also eliminates the optical interference between the FP filter and the absorber. Given in the table are characteristics of two different bolometer designs. More examples are discussed below.

TABLE 1

|  | Tunable Parylene Bolometer #1 | Tunable Parylene Bolometer #2 |
| --- | --- | --- |
| Pitch | 48 μm | 48 μm |
| Fill Factor | 72% | 72% |
| Support material | 0.2 μm Parylene | 0.2 μm Parylene |
| Beam Dimensions | 2 * 13 μm | 2 * 13 μm |
| Absorptance | 95% | 95% |
| Sensing Material | VOx | VOx |
| TCR (%/K$^{-1}$) | 2.3 | 2.3 |
| Responsivity (V/W) | $2.1 * 10^6$ | $1.1 * 10^5$ |
| Detector Noise | 20 μV | 20 μV |
| Time Const. ($\tau_{th}$) | 14.3 ms | 7.5 ms |
| Frame Rate | 32 Hz | 60 Hz |
| NEΔT(f/1) | 6.3 mK | 11.9 mK |

A CMOS-compatible Parylene Optical MEMS technology that enables the present monolithic tunable bolometer AFPA with robustness, small form factor (as small as 30×30 μm$^2$), large fill factor (>70%), low tuning voltage (<50V) and large tuning range has been developed. We propose certain Parylene MEMS technology to implement the present tunable bolometer AFPA. The Parylene MEMS technology has certain desirable characteristics such as anti-stiction and metal-incorporation, to produce high-yield free-standing small/large area Parylene microstructures. In addition, for tunable bolometer application, Parylene has improved combined mechanical and thermal properties (shown in the Table 2) over the commonly used silicon nitride or polysilicon. Parylene is transparent to IR radiation and has a low Young's modulus, high yield strain, low thermal conductivity and low heat capacity. These combined properties enable robustness, small form factor (<50×50 μm$^2$), large fill factor, large tuning range including MWIR/LWIR, high sensitivity, high performance, low tuning voltage and low cost. Moreover, the proposed Parylene optical MEMS technology further allows scalability, array and CMOS compatibility.

TABLE 2

| Properties | Polysilicon | SiNx | Parylene |
| --- | --- | --- | --- |
| Preparation process | LPCVD @ 580° C. + 1050° C. annealing | LPCVD @ T > 800° C. | CVD @ 25° C. |
| Stress (controllable) | −20 Mpa (Low stress) | ~100 MPa | 20 MPa < σ < 50 MPa |
| Young's Modulus (GPa) | ~170 | ~280 | 4-5 |
| Yield Strain (%) | ~1% | ~2% | 2.9% |
| Behavior above yield point | Fracture | Fracture | Plastic |
| Thermal Conductivity (W · m$^{-1}$ K$^{-1}$) | 30 | 3 | 0.084 |
| Heat Capacity (J · K$^{-1}$ cm$^{-3}$) | 1.61 | 2.5 | 0.917 |

A high-performance monolithic pixel-by-pixel adaptive FPA for forward looking infrared (FLIR) and multispectral/hyperspectral imaging (MSI/HIS) on a chip has been proposed according to an embodiment of the present invention. Using the proposed intra-cavity tunable bolometer, a pixel-by-pixel reconfigurable focal plane array (FPA) with high spatial and spectral resolution can be achieved. A forward looking infrared (FLIR) imager on a chip is the natural product of the project. Moreover, a single-chip adaptive multispectral and/or hyperspectral imaging (MSI/HSI) system can be realized. The ability to put a "imaging spectrometer on a chip" will reduce payload weight and volume substantially. The ability to select the wavelength bands of interest, as opposed to the current requirement of having to downlink the entire raw data file and select wavelengths through ground processing, will reduce downlink requirements, eliminate the need for massive on-board storage, and enable real-time multi-spectral image display.

We propose a functional tunable bolometer FPA that maybe used for many different applications or missions such as FLIR, MSI or HIS. Depending upon the specific application, the tunable bolometer FPA may include more than one design according to an embodiment of the present invention. For example, in most cases one has to trade the speed for the sensitivity or visas versus. These characteristics may include specific chemical agent (gas) detection, such as might be used in biological warfare, camouflaged target detection, day/night surveillance and reconnaissance, and detection in a cluttered environment. Of course, there may be other variations, modifications, and alternatives.

According to the present invention, tunable filters are included. A tunable FP filter has two dielectric mirrors separated by an air gap. The gap spacing can be varied by MEMS actuators to tune the transmission wavelength. Desirable performance parameters for tunable FP filters include spectral resolution, optical insertion loss, tuning range, and variation of loss across the tuning band. The spectral resolution is directly related to the finesse of the cavity, which is determined by the reflectivity of the dielectric mirrors. It is desirable to use materials with high refractive index contrast and low IR loss for the DBR. High reflectivity and broad reflection band can be achieved. High index materials may include silicon (n=3.4, useful for SWIR and MWIR, loss is higher for LWIR), germanium (Ge) (n=4.0), and tellurium (Te, n=4.6 for thermally evaporated thin films) and others. Low-refractive index materials in LWIR include $BaF_2$ (n=1.396), KBr (n=1.527), KCl (n=1.457).

Figure 9:
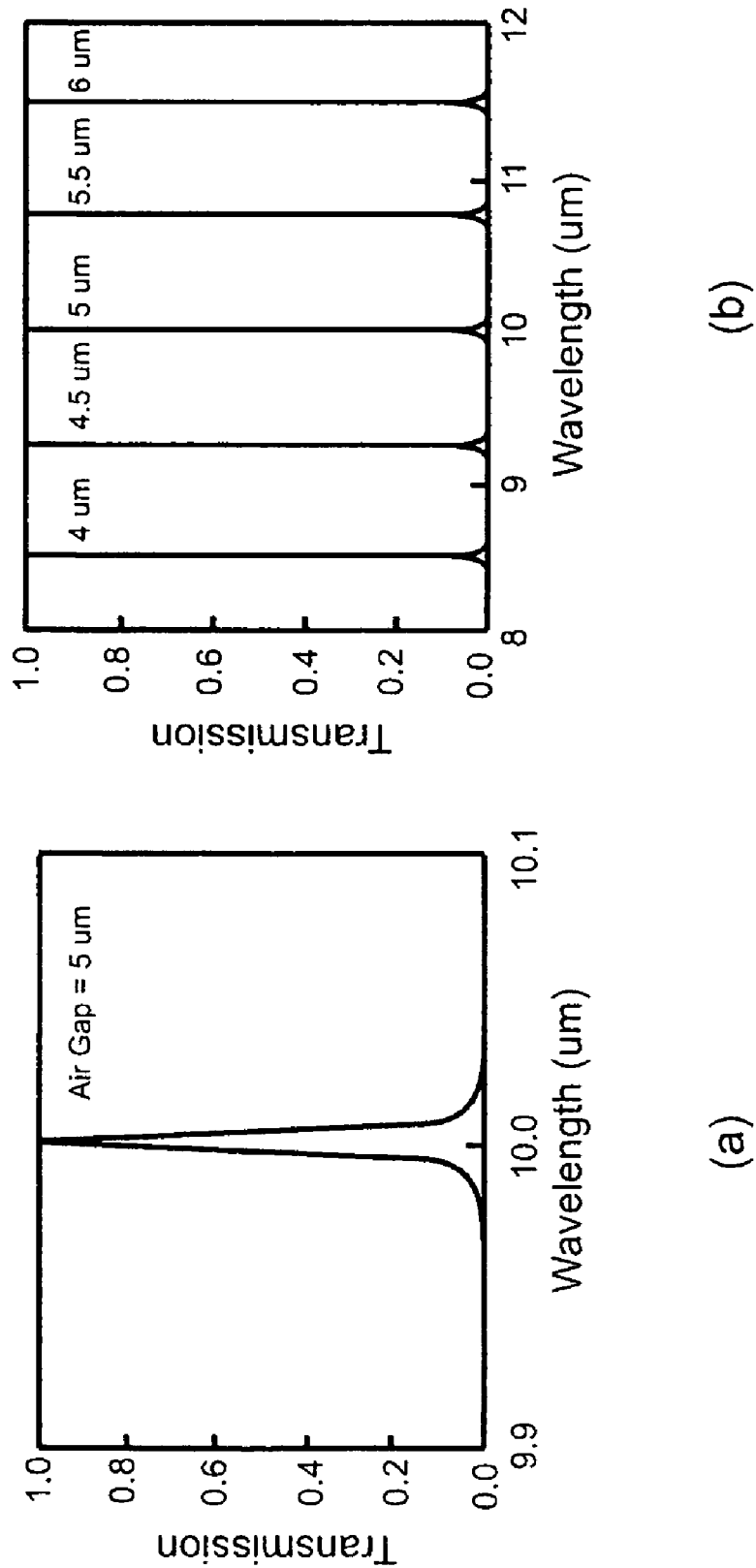

As shown, FIG. 9 illustrates: (a)Tunable FP filters with 2.5 pairs of Ge/$BaF_2$ DBRs for both mirrors; and (b) Tuning across LWIR band by changing the gap spacing between the two DBRs from 4 μm to 6 μm. Many of these materials are soluble in water and present certain limitations in processing and packaging. $BaF_2$, though slightly soluble in water, is more resistant to water and humidity. Other organic materials such as polyethylene (n=1.5) and polystyrene are more stable and have low loss, See, for example, B. Temelkuran, et al., Optics Letters, Vol. 26, p. 1370, 2001. Parylene also have low optical loss at LWIR. These organic thin films and others for broadband DBR's. may be used. We propose to investigate high index contrast DBRs with air gap as low-index material (n=1). We calculated spectrum of a 2.5-pair DBR with Ge/air-gaps. Extremely high reflectivity and ultrawide reflection band (7.5 to 13 μm for R>99%) can be attained. Such air-gap DBR can be made by micromachining techniques. For example, FIG. 9 illustrates a high-performance DBR for applications according to the present invention. The calculated transmission spectra for the tunable FP filters with Te/BaF2 DBRs are also shown. The spectral resolution is 0.005 μm. Lower resolution can be obtained by using 1.5 pairs of DBR's. Tuning is achieved by varying the air gap between the two DBRs electrostatically, as also shown. Both the transmission and the spectral resolution are uniform across the LWIR band based upon at least the ultrawide reflection bandwidth of Te/$BaF_2$ reflectors. Depending upon the application, there may be other variations, modifications, and alternatives.

In a specific embodiment, the present invention also includes an intra-cavity resonance-enhanced tunable bolometer for single-chip adaptive hyperspectral imaging (HSI) applications. Certain benefits have been achieved over conventional approaches.

(1) High absorption with thin-metal absorber: At resonance, the IR waves bounce back and forth in the cavity and go through the absorber many times. Even with very thin absorber, eventually all the IR energy is absorbed. This is analogous to the "integrating sphere" for optical detection. By properly optimizing the mirror reflectivity, almost all the reflected wave can be cancelled out. We will show that over 90% absorption can be attained with 20-nm-thick gold film.

(2) High spectral resolution for HSI: High absorption occurs only at resonance. The function of optical bandpass filter now becomes an integral part of the detector. The spectral resolution is controlled by the finesse of the cavity, and ranges from 0.02 μm to 0.05 μm.

(3) Broad tuning range: The tuning range is the same as that of a tunable FP filter, and can sweep across the entire LWIR (or SWIR, LWIR) if ultra-wide band DBR is used as the mirror.

(4) High D* or low noise equivalent temperature difference (NETD): The small thermal capacity of the absorber enable us to increase the responsivity without excessive thermal time constant. The intra-cavity resonance-enhanced bolometer can achieve better sensitivity than standard bolometers because of the combined small heat capacity of the thin-metal absorber and Parylene.

(5) Fast response time: The thermal time constant, $\tau=C/G$, is reduced because of the reduced thermal capacity, C, of the absorber. This is especially advantageous to provide tracking of fast moving object.

Depending upon the embodiment, one or more of these benefits may be achieved. Referring back to FIG. 1, the present bolometer is operable in a certain manner according to an embodiment of the present invention. As shown, IR radiation is incident from the bottom. A broadband multi-layer dielectric mirror (DBR) is used as the first (bottom) mirror, whereas a thin layer of gold is used as both IR absorber and the second (top) mirror. The reflectivity of 10-nm-thick gold is 98.6% (compared to 99.3% for bulk gold), and the absorption is 1.34% per reflection. At resonance, the IR waves are reflected back and forth in the cavity many times, and eventually all the IR energy will be absorbed by the gold film, except for the energy transmitted through the gold film, which is negligible for gold thicker than 20 nm, and the loss in the dielectric mirrors. Maximum absorption occurs when the reflectivity of the DBR is equal to that of gold film, at which point the reflected wave is completely cancelled out.

Figure 10:
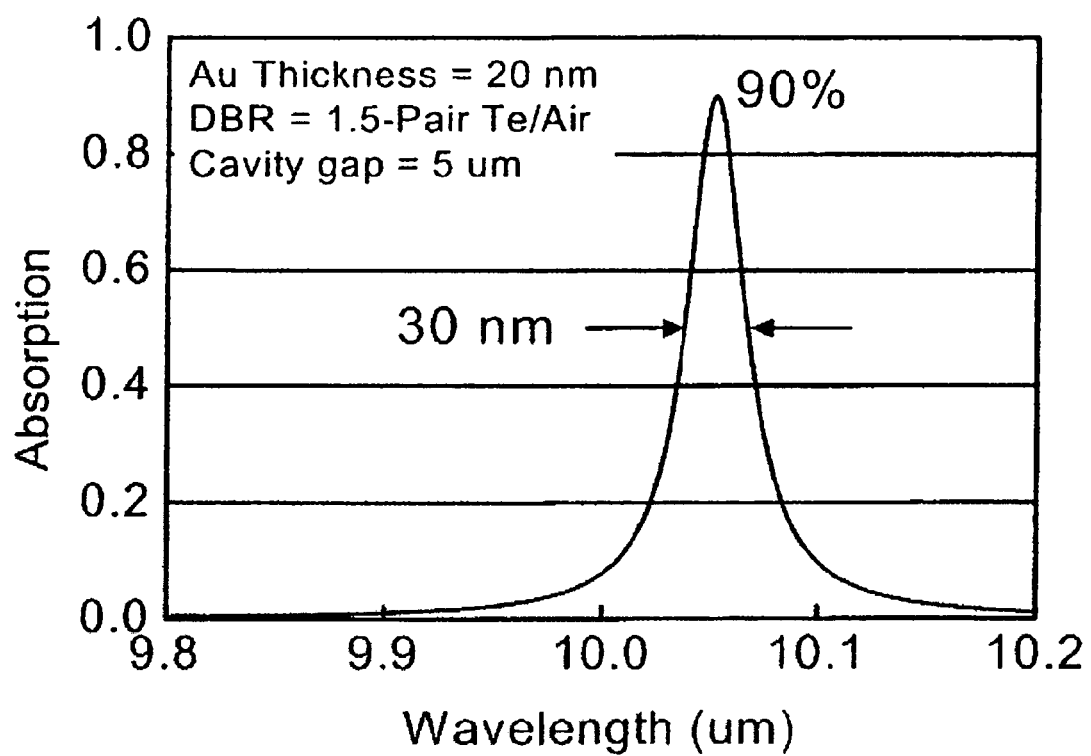

Preferably, the present intra-cavity absorber enables a significant reduction of the thickness of absorber and its thermal capacitance, which leads to improvements of the sensitivity and response time of bolometer, in addition to the spectral tunability for AFPA. The spectral response of the intra-cavity tunable bolometer with 20-nm-thick Au absorber/reflector and a 1.5-pair Te/air DBR is shown in FIG. 10. As shown is spectral response of the intra-cavity tunable bolometer with 20-mn-thick Au absorber/reflector and 1.5-pair Te/air DBR. The peak absorption is 90%, and the spectral resolution is 0.03 μm. Peak absorption of 90% and spectral resolution of 0.03 μm can be achieved. This is sufficient for hyperspectral imaging AFPA.

According to a specific embodiment, Parylene MEMS technology will be used as a material to fabricate portions of the resonance-enhanced tunable bolometers. Parylene-N, C or D have a relatively low Young's Modulus about 4-5 GPa. In comparison, the commonly used MEMS materials like low-stress polysilicon and silicon nitride have moduli of 150 GPa and 280 GPa, respectively. Therefore, Parylene MEMS would allow smaller geometric sizes for mechanical suspensions or springs when compared to polysilicon or low-stress silicon nitride. In addition, when one considers the performance of a bolometer adopting thermal insulating beams, it is obvious that the desirable beam materials should have small heat capacity and low thermal conductivity. This is another advantage for the present Parylene bolometer. Still other advantages include ease of deposition, low Young's modulus, high yield strain, low thermal conductivity and heat capacity. Parylene tunable bolometer have shown superior device performance when compared to conventional uncooled bolometers. Certain details of these comparisons are shown in Table 3.

To gain more insight into the design trade-offs of intra-cavity tunable bolometer, we have developed a preliminary model to compare the performance of various detectors. The model is based on transmission matrix, and consider both real and complex index of the materials. First, we investigate the effect of the thickness of the gold absorber/mirror. The bottom reflector is a 2.5-pair Ge/$BaF_2$ DBR. For thick gold film (100 nm), the reflectivity approaches that of bulk gold (R=99.4%). High peak absorption (95%) and high spectral resolution (FWHM=0.02 μm) are achieved. We then gradually reduce the thickness of Au. There is no significant change until it reaches 20 nm, at which point the peak absorption drops slightly to 90%, and the spectral resolution broadens to 0.03 μm (FWHM). The use of intra-cavity absorber enables us to significantly reduce the thickness of absorber and its thermal capacitance. As shown earlier, this significantly improves the sensitivity and response time of bolometer, in addition to the spectral tunability for A-FPA.

Figure 11:
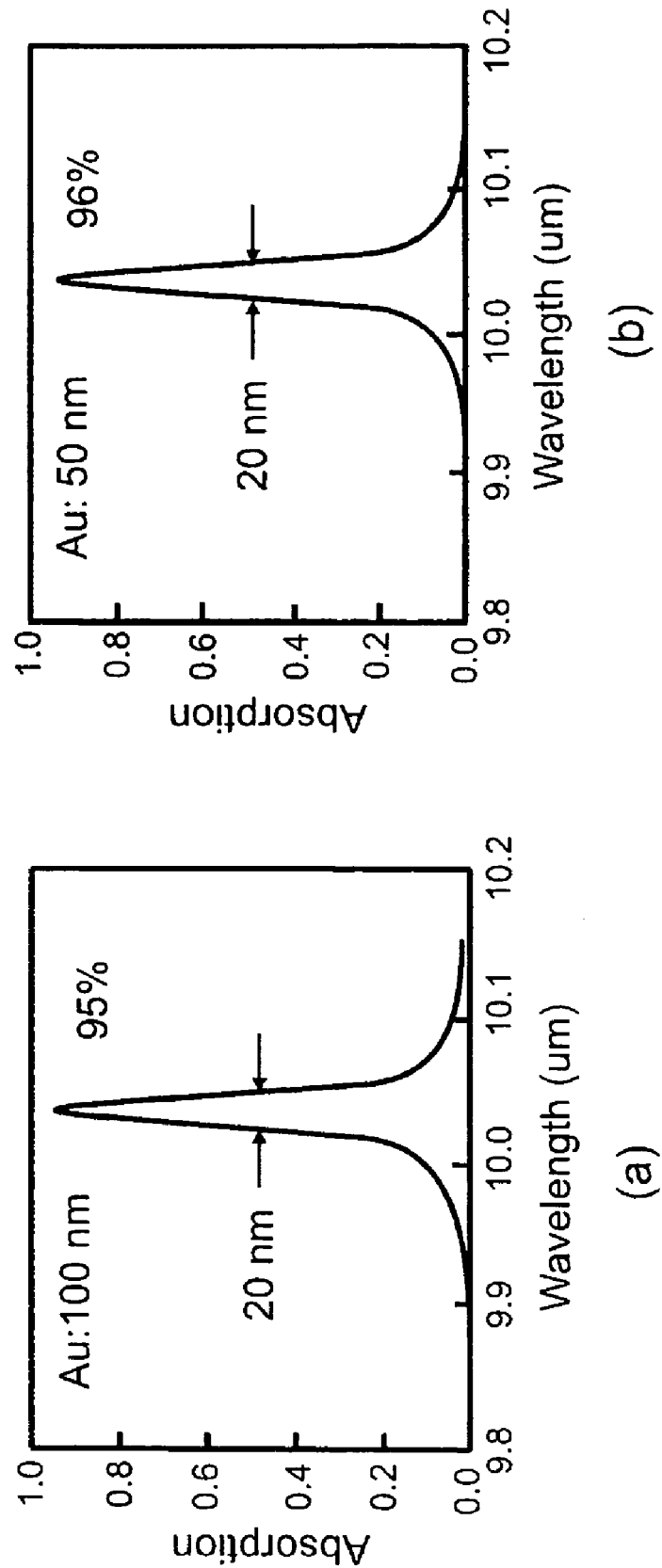
Figure 11:
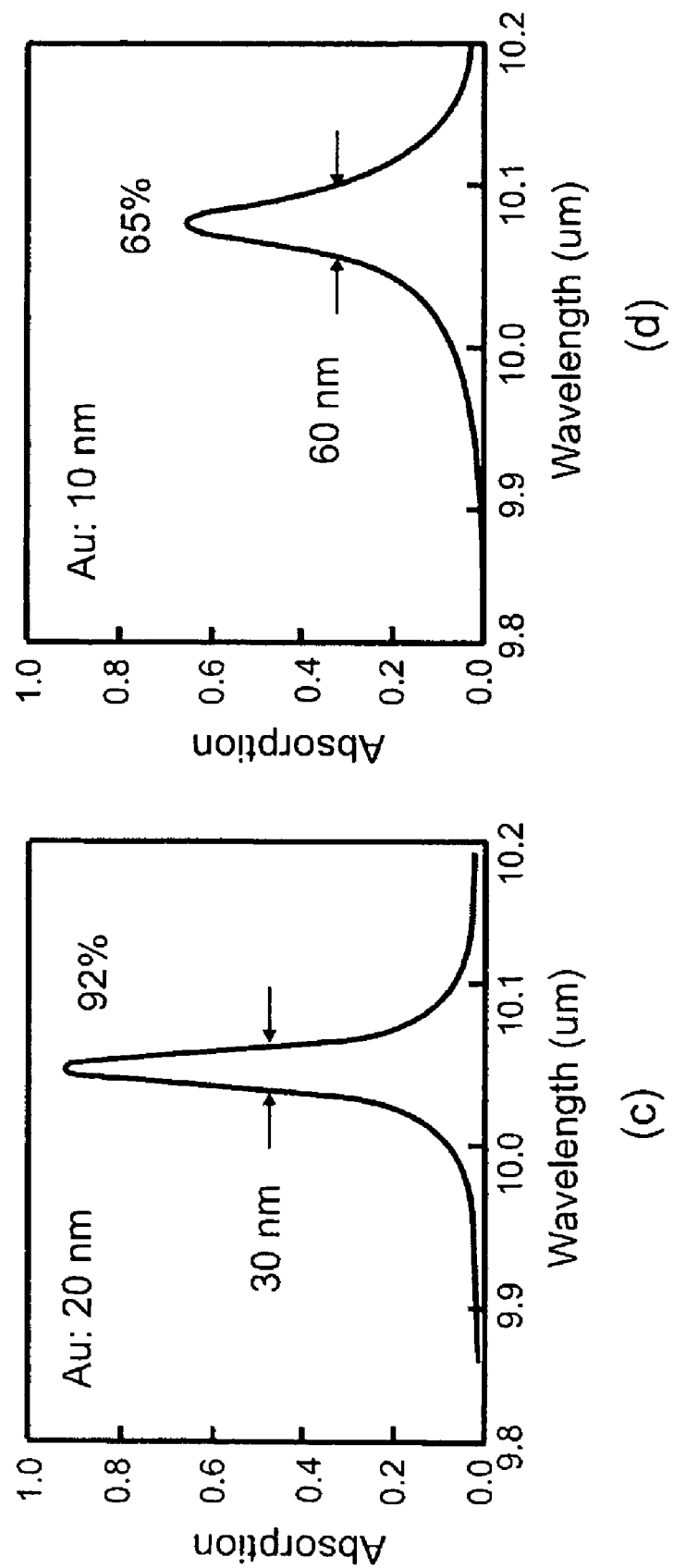

Referring to FIG. 11, calculated absorption of intra-cavity bolometers with (a) 100 nanometer thick; (b) 50 nanometer thick; (c) 20 nanometer thick; and (d) 10 nanometer thick Au film as absorber/mirror. Other mirror is a 2.5 pair Ge/BaF$_2$ DBR.

Figure 12:
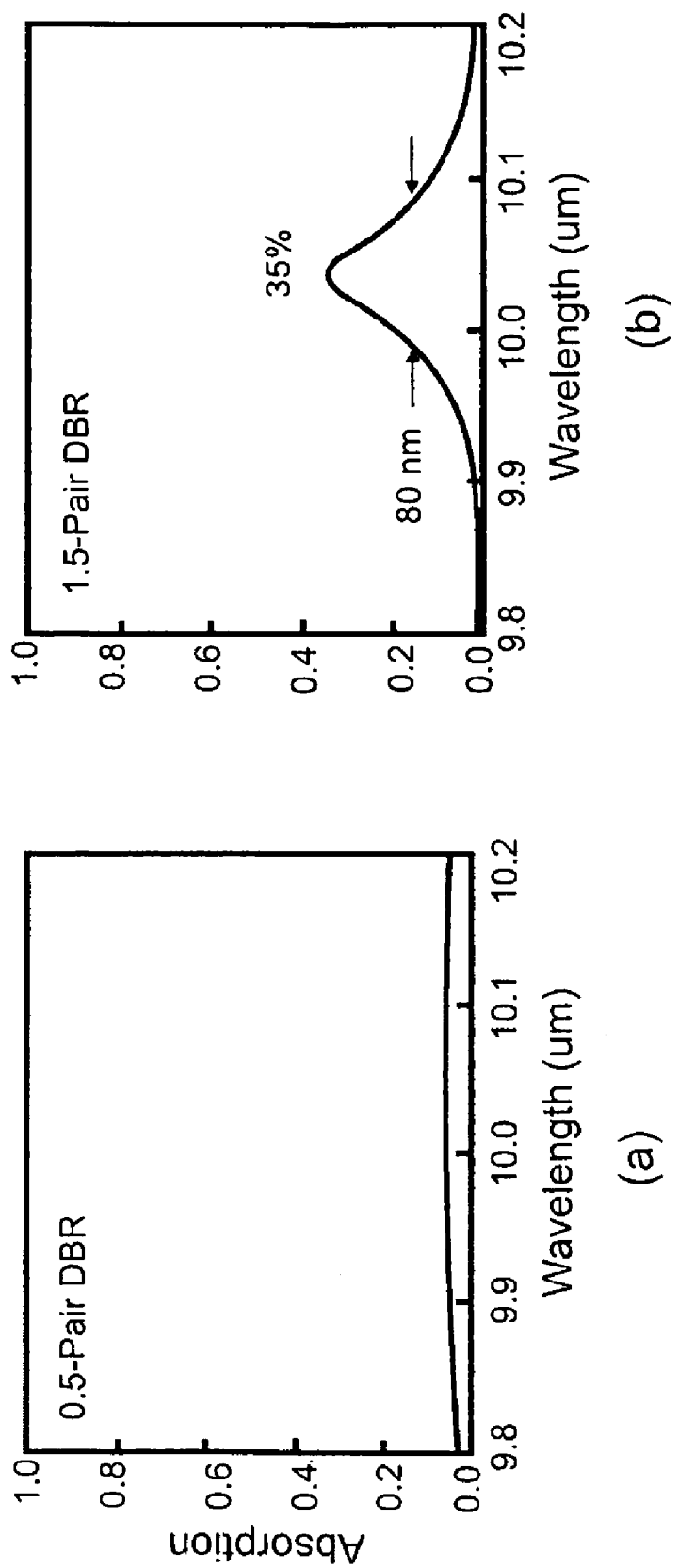

Optimum absorption is attained when the reflectivities of the top and the bottom mirrors match. FIG. 12 shows the calculated absorption of intra-cavity bolometers with 50-nm-thick gold absorber/reflector and DBRs with various numbers of pairs for the other reflectors. It shows that best performance is achieved for 2.5 pairs of DBR according to a specific embodiment. Higher reflectivity (3.5-pair DBR) results in imperfect cancellation of reflected wave and, as a result, lower absorption.

We can optimize the optical performance of resonance-enhanced intra-cavity tunable bolometer by controlling the thickness of gold film and the DBR parameters (the number of pairs and the refractive index contrast). A key optimization is to match the reflectivity of DBR and Au mirrors. Table III summarizes the performance of different designs. For DBR with 2.5 pairs of Ge/BaF$_2$, the thinnest Au thickness with good performance is 30 nm. For DBR with larger refractive index contrast, Te/air-gap ($\Delta n=3.6$), reflectivity of 99.1% can be achieved with only 1.5 pairs. The thinnest gold film with good performance is 20 nm. Of these two designs, the latter has thinner gold (20 nm) and is more attractive to achieve small NETD and fast response time. These will be our starting parameters for our proposed AFPA.

TABLE 3

| DBR | Au thickness | Peak Absorption Tuned to | | | Bandwidth |
| --- | --- | --- | --- | --- | --- |
| | | $\lambda$~8 µm | $\lambda$~10 µm | $\lambda$~12 µm | |
| 2.5-Pair Ge/BaF$_2$ | 20 nm | 92% | 75% | 90% | 0.025 µm |
| | 30 nm | 95% | 90% | 98% | 0.02 µm |
| | 40 nm | 93% | 95% | 99% | 0.02 µm |
| | 50 nm | 90% | 97% | 99% | 0.02 µm |
| 1.5-Pair Te/BaF$_2$ | 20 nm | 82% | 93% | 87% | 0.05 µm |
| 1.5-Pair Te/Air | 20 nm | 93% | 90% | 95% | 0.03 µm |

Figure 13:
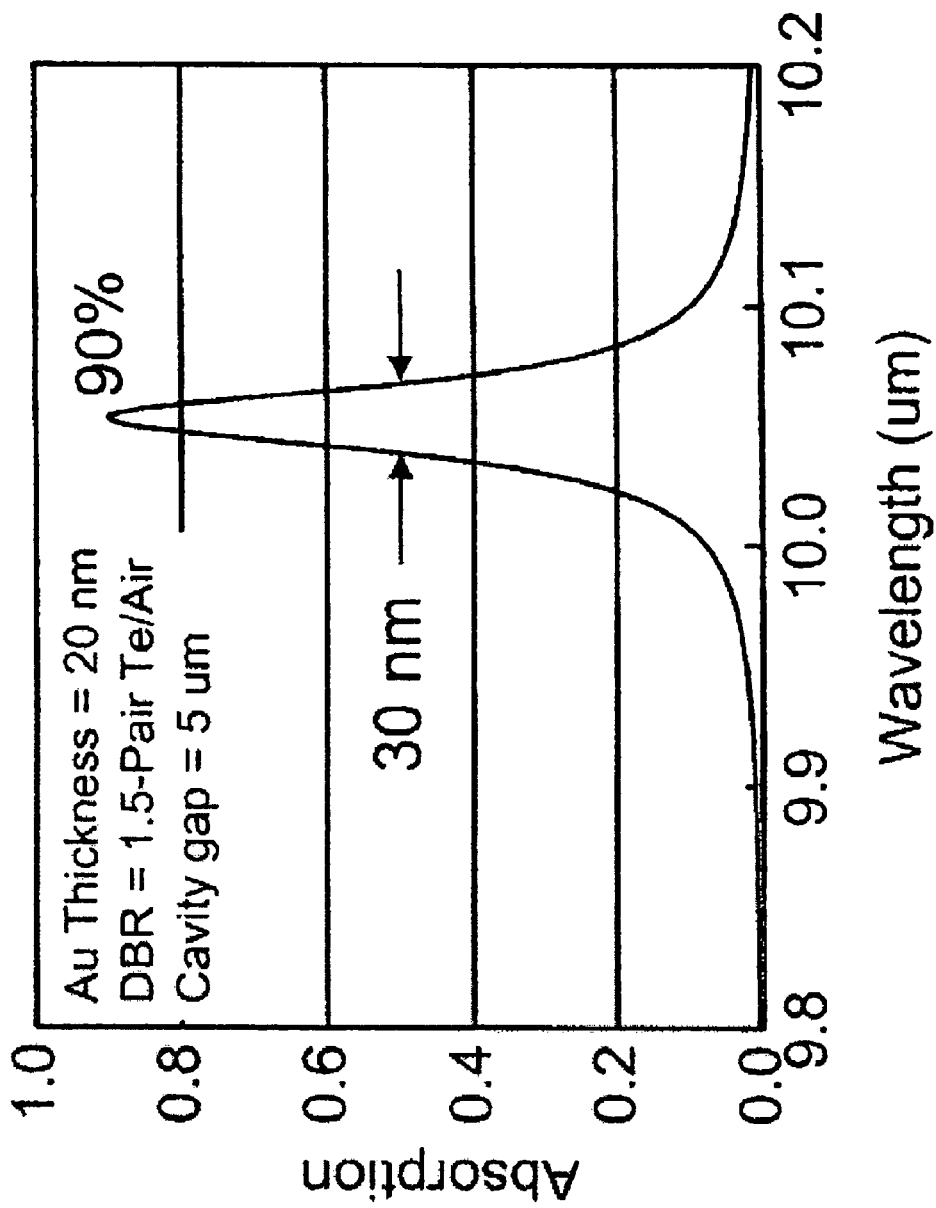
Figure 14:
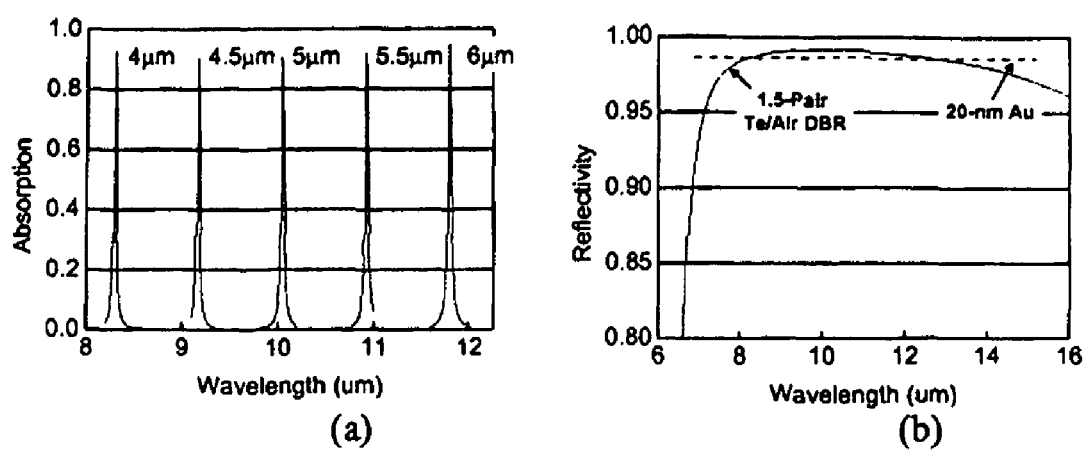

The spectral response of the intra-cavity tunable bolometer with 20-nm-thick Au absorber/reflector and a 1.5-pair Te/air DBR is shown in FIG. 13. Peak absorption of 90% and spectral resolution of 0.03 µm can be achieved. This is sufficient for hyperspectral imaging A-FPA. The tuning characteristics of the bolometer is shown in FIG. 11. When the gap between the Au absorber and the DBR is varied from 4 to 6 µm by MEMS actuator, the signal detection wavelength moves smoothly from 8.3 µm to 11.7 µm. The peak absorption is very uniform across the tuning range, thanks to good matching of the reflectivity of the DBR and 20-nm-thick gold (FIG. 14(b)).

Knowing the filter parameters including the thickness of the absorber and absorbance, one can proceed to calculate the performance of a bolometer. The following lists simplified equations that we use to calculate the performance of our proposed tunable bolometer according to the bolometer structure.

Heat conductance

Heat conductance in W.K$^{-1}$:

$$G_{total} \approx 2\frac{k_{ti}wh_{ti,beam}}{L} + 4\frac{k_{parylene}wh_{parylene,beam}}{L}$$

$k_{parylene}$, $k_{ti}$: heat conductivities in W.K$^{-1}$.m$^{-1}$

Heat capacitance

Heat capacitance in J.K$^{-1}$:

$C_{parylene} = c_{parylene}\rho_{parylene}A_{pixel}h_{parylene,pixel}$ $C_{gold} = c_{gold}\rho_{gold}A_{pixel}h_{gold,pixel}$ $c_{parylene}$, $c_{gold}$: specific heat capacities in J.K$^{-1}$.m$^{-3}$ $\rho_{parylene}$, $\rho_{gold}$: densities in Kg.m$^{-3}$ Time constant:

$$\tau_{thermal} = \frac{C_{total}}{G_{total}}$$

Responsivity:

$$r = \frac{\eta\alpha\beta V_{bias}}{G_{total}}$$

in V.W$^{-1}$

Where $\eta$ is the absorbance, $\alpha$ is the TCR of the thermistor, $\beta$ is the fill factor, $V_{bias}$ is the bias voltage, and $G_{total}$ is the thermal conductance from one pixel to the substrate.

Noise-Equivalent Temperature Difference (NETD)

$$N E\Delta T = \frac{4F^2 V_N}{t\beta A_{pixel}r(dP/dT)_{8\mu m - 14\mu m}}$$

$$= \frac{4F^2 V_N G_{total}}{t\alpha\beta\eta V_{bias}A_{pixel}(dP/dT)_{8\mu m - 14\mu m}}$$

$$= \frac{4F^2 V_N}{t\alpha\beta\eta V_{bias}A_{pixel}(dP/dT)_{8\mu m - 14\mu m}} \frac{C_{total}}{\tau_{thermal}}$$

where F is the F number of the optical system (i.e. if f/2 optics, F=2), $V_N$ is the rms noise voltage, t is transmission factor of the optical system, $A_{pixel}$ is the area of a pixel, $\beta$ is the fill factor, r the responsivity, and $(dP/dT)_{8\mu m-14\mu m}$ is the differential change in emittance of a blackbody for wavelengths between 8 µm and 14 µm. It has units of W.m$^{-2}$.K$^{-1}$

TABLE 3

| | Bolometer #1 | Bolometer #2 | Bolometer #3 | Bolometer #4 |
| --- | --- | --- | --- | --- |
| Pitch | 48 µm | 48 µm | 48 µm | 30 µm |
| Fill Factor | 72% | 72% | 72% | 36% |
| Support material | 0.2 µm Parylene | 0.2 µm Parylene | 0.2 µm Parylene | 0.2 µm Parylene |

TABLE 3-continued

|  | Bolometer #1 | Bolometer #2 | Bolometer #3 | Bolometer #4 |
|---|---|---|---|---|
| Beam | 2 Beams: 0.2 μm Par | 2 Beams: 0.2 μm Par | 2 Beams: 0.2 μm Par | 2 Beams: 0.2 μm Par |
|  | 2 Beams: 0.2 μm Par + 40A Ti | 2 Beams: 0.2 μm Par + 90A Ti | 2 Beams: 0.2 μm Par + 90A Ti | 2 Beams: 0.2 μm Par + 20A Ti |
| Beam Lateral Dimensions | 2 μm * 13 μm | 2 μm * 13 μm | 2 μm * 13 μm | 2 μm * 13 μm |
| Thermal Capacitance (J · K$^{-1}$) | 5.3 * 10$^{-10}$ | 5.3 * 10$^{-10}$ | 5.3 * 10$^{-10}$ | 1.2 * 10$^{-10}$ |
| Thermal Conductance (W · K$^{-1}$) | 3.7 * 10$^{-8}$ | 7.1 * 10$^{-8}$ | 7.1 * 10$^{-8}$ | 2.4 * 10$^{-8}$ |
| Thermal Time Constant | 14.3 ms | 7.5 ms | 7.5 ms | 5.2 ms |
| Absorptance | 95% | 95% | 95% | 95% |
| Sensing Material | VOx | VOx | Implanted Parylene | VOx |
| TCR (%/K$^{-1}$) | 2.3 | 2.3 | #2 | 2.3 |
| Pixel Resistance | 20 kΩ | 20 Kω | #10 MΩ | 20 kΩ |
| Responsivity (V · W$^{-1}$) | 2.1 * 10$^6$ | 1.1 * 10$^5$ | 9.6 * 10$^6$ | 1.6 * 10$^6$ |
| Detector Noise | #20 μV | #20 μV | #20 μV | #20 μV |
| Frame Rate" | 32 Hz | 60 Hz | 60 Hz | 64 Hz |
| Maximum Tuning Voltage | <40 V | <40 V | <40 V | <50 V |
| NEΔT (f/1) | 6.3 mK | 11.9 mK | 13.7 mK | 20 mK |

Calculated or reasonably assumed;
"for 90% signal readout

In Table 3, we list four of our Parylene tunable bolometer designs and the conventional devices. Our design #1 aims at the lowest noise equivalent temperature difference ("NETD") while maintains a frame rate of 32 Hz. Clearly seen is a calculated (with some reasonable assumptions) NETD of 6.3 mK, which is the best among all. Our design #2-4 then aims at providing a higher frame rate at 60 Hz while maintains a low NETD no more than 20 mK. The superior performance over conventional silicon-nitride bolometer is due to the superior properties of Parylene and the thin absorber.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An integrated tunable sensing apparatus for electromagnetic radiation, the sensing apparatus comprising:
    a substrate comprising a backside and a face, the substrate transparent to incident electromagnetic radiation of a wavelength and having a first reflection device formed on the backside;
    a tunable cavity region coupled to the backside of the substrate and configured to receive the incident electromagnetic radiation transmitted through the substrate;
    an elastic material forming a region including the tunable cavity region;
    the first reflection device within a first portion of the tunable cavity region;
    a second reflection device within a second portion the cavity region and facing the first reflection device;
    a movable gap formed between the first reflection device and the second reflection device within the tunable cavity region;
    an actuation device coupled to the tunable cavity region, the actuation device being adapted to cause movement from a first predetermined spatial dimension to a second predetermined spatial dimension of the movable gap; and
    a detection device coupled to the tunable cavity.

2. The apparatus of claim 1 wherein the detection device comprises one of the reflection devices.

3. The apparatus of claim 1 wherein electromagnetic radiation is IR.

4. The apparatus of claim 1 wherein the first predetermined spatial dimension ranges from about 1.5 Microns to about 4 Microns.

5. The apparatus of claim 1 wherein the second predetermined spatial dimension ranges from about 2.5 Microns to about 8 Microns.

6. The apparatus of claim 1 wherein the detection device is a temperature sensing device.

7. The apparatus of claim 6 wherein the temperature sensing device comprises one of the first or second reflection devices.

8. The apparatus of claim 1 further comprising a drive device coupled to the actuation device.

9. The apparatus of claim 1 further comprising a control device coupled between the detection device and drive device.

10. The apparatus of claim 1 the substrate comprises a silicon wafer.

11. The apparatus of claim 1 wherein the detection device is adapted to capture information associated with a selected wavelength range within an IR range of electromagnetic radiation having the selected wavelength range, the electromagnetic radiation having the selected wavelength range having a resonating characteristic between the first reflection device and the second reflection device within the tunable cavity region.

12. The apparatus of claim 11 wherein the selected wavelength range is selected from 3-5 Microns and 8-14 Microns.

13. The apparatus of claim 12 wherein tunable cavity region is free from electromagnetic radiation outside of the selected wavelength range having a resonating characteristic.

14. The apparatus of claim 13 wherein the movable gap is maintained at the second predetermined spatial dimension to provide the resonating characteristic of the electromagnetic radiation between the first reflection device and the second reflection device.

15. The apparatus of claim 1 wherein the substrate, the elastic material, first reflection device, second reflection device, movable gap, actuation device and detection device are enclosed in a package, the package having a window region facing the backside of the substrate, the window region being adapted to allow electromagnetic radiation to traverse there through.

16. The apparatus of claim 15 wherein the package provides a vacuum in the tunable cavity.

17. A method for sensing electromagnetic radiation having a predetermined spatial frequency, the method comprising:

providing a substrate transparent to a band of electromagnetic radiation and having a first reflection device formed on a backside;

providing a tunable cavity region, the tunable cavity region comprising an elastic material forming a region including the tunable cavity region, the tunable cavity region having the first reflection device within a first portion of the tunable cavity region and having a second reflection device within a second portion the cavity region and facing the first reflection device, the tunable cavity region having a movable gap formed between the first reflection device and the second reflection device within the tunable cavity region;

wherein the tunable cavity region is coupled to the transparent substrate;

receiving the band of electromagnetic radiation transmitted through the substrate;

moving the movable gap from a first predetermined spatial dimension to a second predetermined spatial dimension using an actuation device coupled to the tunable cavity region;

causing a resonating characteristic of a selective wavelength corresponding to the band of electromagnetic radiation between the first reflection device and the second reflection device within the tunable cavity while being maintained at the second predetermined spatial dimension;

preventing one or more wavelengths outside of the selected wavelength from achieving the resonating characteristic between the first reflection device and the second reflection device while being maintained at the second predetermined spatial dimension; and capturing information associated with the selected wavelength using a detection device coupled to the tunable cavity region.

18. The method of claim 17 wherein the detection device comprises one of the reflection devices.

19. The method of claim 17 wherein electromagnetic radiation is IR radiation.

20. The method of claim 17 wherein the first predetermined spatial dimension ranges from about 2.5 Microns to about 7 Microns.

21. The method of claim 17 wherein the second predetermined spatial dimension ranges from about 1.5 Microns to about 4 Microns.

22. The method of claim 17 wherein the detection device is a temperature sensing device.

23. The method of claim 17 wherein the elastic member is a polymer.

24. The method of claim 17 where the actuation device is coupled to a drive device.

25. The method of claim 17 wherein the selected wavelength range is selected from 3-5 Microns to 8-14 Microns.

* * * * *

UNITED STATES PATENT AND TRADEMARK OFFICE
CERTIFICATE OF CORRECTION

PATENT NO. : 7,378,655 B2
APPLICATION NO. : 10/821790
DATED : May 27, 2008
INVENTOR(S) : Tai et al.

It is certified that error appears in the above-identified patent and that said Letters Patent is hereby corrected as shown below:

On the title page, item (73) Assignee, please add
    --The Regents of the University of California, Oakland, CA (US)--

Signed and Sealed this

Nineteenth Day of January, 2010

David J. Kappos
*Director of the United States Patent and Trademark Office*